__United States Patent__ [19]

Amann et al.

[11] Patent Number: 4,672,083

[45] Date of Patent: Jun. 9, 1987

[54] OXYMETHYLENE COPOLYMERIZATE MOLDING COMPOSITIONS WITH REDUCED FORMALDEHYDE EMISSION IN THE THERMOPLASTIC PROCESSING

[75] Inventors: Herbert Amann; Gerhard Morlock, both of Hanau; Egbert Schola, Friedrichsdorf, all of Fed. Rep. of Germany

[73] Assignee: Degussa AG, Frankfurt am Main, Fed. Rep. of Germany

[21] Appl. No.: 865,444

[22] Filed: May 21, 1986

[30] Foreign Application Priority Data

May 22, 1985 [DE] Fed. Rep. of Germany ....... 3518375

[51] Int. Cl.[4] ........................... C08K 5/34; C08K 5/48
[52] U.S. Cl. ..................... 524/86; 524/597; 525/472; 528/252; 528/254
[58] Field of Search ............... 528/252, 254; 525/472; 524/86, 597

[56] References Cited

U.S. PATENT DOCUMENTS

| | | | |
|---|---|---|---|
| 3,380,966 | 4/1968 | Fouts | 525/472 |
| 3,485,799 | 12/1969 | Park | 525/472 |
| 4,024,105 | 5/1977 | Sextro et al. | 525/472 |
| 4,230,606 | 10/1980 | Amann et al. | 528/254 |
| 4,515,938 | 5/1985 | Swearingen et al. | 528/252 |
| 4,543,388 | 9/1985 | Treybig | 524/597 |

*Primary Examiner*—Lucille M. Phynes
*Attorney, Agent, or Firm*—Cushman, Darby & Cushman

[57] ABSTRACT

The formaldehyde emission in the thermoplastic processing of antioxidant containing oxymethylene copolymer molding compositions is reduced considerably if these molding compositions additionally contain on the surface or homogeneously mixed in a specifically defined formaldehyde binding material which contains in the molecule at least two 4,6-diamino-1,3,5-triazin-2-yl groups. In this way there are avoided deposits on the die and odor annoyance.

5 Claims, No Drawings

OXYMETHYLENE COPOLYMERIZATE MOLDING COMPOSITIONS WITH REDUCED FORMALDEHYDE EMISSION IN THE THERMOPLASTIC PROCESSING

BACKGROUND OF THE INVENTION

The invention is directed to an antioxidant containing oxymethylene copolymer-molding composition in the thermoplastic processing.

In the thermoplastic processing of oxymethylene copolymer molding compositions, there are set free small amounts of formaldehyde. Thereby, it can be a matter of dissolved formaldehyde which gasses out of the melt and the hot molded parts or of formaldehyde which is formed by thermally splitting off. The use of special more economical processing methods is frequently possible only with increased exposure of the polymerizate melt to heat. With increasing exposure to heat, however, there is increased danger of damage to the product and therewith increased emission of formaldehyde. The setting free of formaldehyde is unpleasant in two aspects. It can lead to health problems of the service personnel and make necessary suction apparatuses and absorption plants for the protection of the environment. Furthermore, the formaldehyde emitted can also cause deposits on dies and through this damage the surface quality and the true dimensions of the molded pieces.

Therefore, there exists a pressing demand to reduce the formaldehyde emission in the thermoplastic processing of oxymethylene copolymer molding compositions. This demand is satisfied by the molding compositions of the invention.

SUMMARY OF THE INVENTION

The oxymethylene copolymer molding compositions of the invention additionally contain on the surface or homogeneously mixed in at least one formaldehyde binding material of the formula:

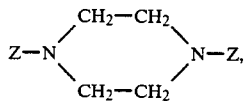

(I)

(II)

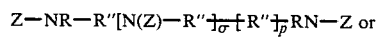

(III)

$$Z-R'''-Z \quad (IV)$$

in which

Z is a 4,6-diamino-1,3,5-triazin-2-yl group,

R is hydrogen or a monovalent saturated or unsaturated, straight chain or branched aliphatic hydrocarbon group having up to 18 carbon atoms or a monovalent unsubstituted or a with one or more aliphatic hydrocarbon groups substituted cycloaliphatic or aromatic hydrocarbon group (e.g., R can be methyl, ethyl, propyl, isopropyl, butyl, sec. butyl, t-butyl, amyl, hexyl, octyl, isooctyl 2-ethylhexyl, decyl, dodecyl, octadecyl, allyl, crotyl, oleyl, methallyl, cyclopropyl, cyclopentyl, cyclohexyl, methyl cyclohexyl, phenyl, tolyl, xylyl, butylphenyl, 2,6-dibutylphenyl, napththyl), R' is a di to pentavalent saturated or unsaturated, straight chain or branched aliphatic hydrocarbon group having 1 to 18 carbon atoms (e.g., ethylene, propylene, tetramethylene, hexamethylene, decamethylene, octadecamethylene, isobutylene, $-CH_2CH=CH-CH_2-$), a di to pentavalent unsubstituted or with one or more aliphatic hydrocarbon group substituted cycloaliphatic or aromatic hydrocarbon group (e.g., cyclopentylene, cyclohexylene, cyclooctylene, phenylene, tolylene, xylylene), a divalent aliphatic-cycloaliphatic or aliphatic-aromatic hydrocarbon group containing up to 18 carbon atoms having the structure $-A-B-$ or $-A-B-A$ in which A is a divalent aliphatic and B is a divalent unsubstituted or with one or more aliphatic hydrocarbon group substituted cycloaliphatic or aromatic hydrocarbon group, or a di to pentavalent group of the structure $-C-X-C-$ having 1 to 18 carbon atoms, in which C is an at least divalent cycloaliphatic or aromatic hydrocarbon group and X is a divalent straight chain or branched aliphatic hydrocarbon group, $-O-$, $-S-$, or $-SO_2-$, R'' is a divalent straight chain or branched aliphatic group having up to 6 carbon atoms, R''' is a divalent straight chain or branched aliphatic hydrocarbon group having up to 12 carbon atoms or a divalent cycloaliphatic or aromatic hydrocarbon group having up to 12 carbon atoms, n is 0, 1, 2 or 3, $\sigma$ is 1, 2 or 3 and $p$ 0 or 1

The formaldehyde binding materials of formulae (I) to (IV) are suitably used in an amount between 0.2 and 50 parts by weight, preferably between 0.5 and 10 parts by weight to 1000 parts by weight of oxymethylene copolymer. Their use can take place in very different ways. Thus, they can be applied, for example, as is also done with lubricants or coloring pigments, on the surface of molding composition granulates. The danger of demixing in transportation is reduced, if hereby so-called adhesive oils (e.g., mineral or silicone oils) are used at the same time. To entirely exclude a possible demixing and to avoid the additional working processes, however, there is preferred the incorporating into the oxymethylene copolymer. The formaldehyde binding material can be dosed in alone or in admixture, e.g., with other additives at a suitable place in the compounding machine and the formaldehyde binding material incorporated into the molten oxymethylene copolymer at that place. However, it is also possible to first mix the formaldehyde binding materials together with stabilizers and in a given case further additives in a powder mixer with the oxymethylene copolymer and subsequently, to melt and homogenize in a compounding machine. Twin screw extruders are especially suited as compounding machines. It has also been found that the formaldehyde binding materials also remain effective if they are added to a crude oxymethylene copolymer which still contains formaldehyde that can be split off and the mixture is homogenized and degassed in a vented extruder. This is unexpected since there must have been considered the possibility that the formaldehyde split off in the extruder would react with the formaldehyde binding materials and this would be made inoperative thereby.

The materials of formulae (I), (II), and (III) with which especially good results are produced can be formed, for example, by reacting 2-chloro-4,6-diamino-1,3,5-triazine, suitably in the presence of an acid acceptor, with corresponding di or polyvalent amines. There can be employed as such amines, for example:

1,2-diaminoethane, 1,4-diaminobutane, 1,6-diaminohexane, 1,10-diaminodecane, 1,12-diaminododecane, diethylenetriamine, triethylenetetramine, tetraethylenepentamine, 1,2-butanediamine, 1,2-propanediamine, 3,3'-diphenyldiamine, 1,2-bis(cyclohexylamino)-ethane, 1,2-bis(phenylamino)-ethane, 1,2-bis(benzylamino)-ethane, 1,2-bis(methylamino)-ethane, 1,2-bis(tolylamino)-ethane, 1,2-bis(allylamino)-ethane, 1,3-bis(naphthylamino)-propane, 1,3-bis(xylylamino)-propane, 1,4-bis(phenylamino)-butane, 1,4-bis-(phenylethylamino)-butane, 1,3,5-triaminopentane, 1,3,5-tris(-phenylamino)-pentane, 1,3,5-tris(decylamino)-pentane, 1,3,5,7-tetraaminoheptane, 1,3,5,7-tetrakis(tolylamino)-heptane, 1,3,5,7,9-pentaaminononane, 1,3,5,7,9-pentakis(ethylamino)-nonane, 1,4-diamino-2-butene, 3,4-diamino-1-butene, 3,4-diamino-1-pentene, 1,4-diamino-2-pentene, 5,6-diamino-1-hexene, 2,4-diaminotoluene, 1,8-diaminonaphthalene, bis(4-aminophenyl)-methane, bis(4-aminophenyl)-sulfone, bis(4-aminophenyl)-ether, 1,3-bis(aminomethyl)-cyclohexane, 3-aminomethyl-3,5,5-trimethylcyclohexylamine, 1,3-bis(aminomethyl)-benzene, bis(4-aminocyclohexyl)-methane, bis(3-aminopropyl)-amine, N,N'-bis(3-aminopropyl)-ethylenediamine, or N,N'-bis(3-aminopropyl)-butanediamine(1,4).

The materials of formula (IV) can be produced by reacting dicyandiamide in dimethylsulfoxide as a solvent and in the presence of an alkali metal alcoholate (e.g., sodium methylate or ethylate, potassium methylate or ethylate) with the corresponding dinitriles. As dinitriles there can be employed, for example:

malonic acid-dinitrile, propylmalonic acid-dinitrile, succinic acid-dinitrile, 2,2-dimethyldinitrile, succinic acid-dinitrile, glutaric acid-dinitrile, 2-methylglutaric acid-dinitrile, adipic acid-dinitrile, pimelic acid-dinitrile, suberic acid-dinitrile, azelaic acid-dinitrile, sebacic acid-dinitrile, 5,8-dimethyl-dodecandicarboxylic acid-1,12-dinitrile, phthalodinitrile, isophthalodinitrile, terephthalodinitrile, cyclohexane-1,2-dicarbonitrile, cyclohexane-1,4-dicarbonitrile.

The formaldehyde binding materials can be used in an amount of 0.2 to 50 parts by weight to 1000 parts by weight of copolymer.

The oxymethylene copolymer in the molding composition of the invention in general contains 90 to 99.9 mole percent oxymethylene and 10 to 0.1 mole percent comonomer units, preferably 97 to 99.5 mol percent oxymethylene and 3 to 0.5 mole percent comonomer units. The comonomer units preferably of the following structure:

In this formula, R is a hydrogen atom or an alkyl group having 1 to 6 carbon atoms (e.g., methyl, ethyl, propyl, isopropyl, butyl, hexyl), preferably 1 to 3 carbon atoms, an alkoxymethyl group having 2 to 6 carbon atoms (e.g., ethoxy, propoxy, butoxy, hexoxy), preferably 2 to 4 carbon atoms, a phenyl group or a phenoxymethyl group, y is a whole number from 1 to 5 in which case z is 1, when y is 1 and R is a hydrogen atom z can be 2 or 3. The oxymethylene copolymer preferably has hydroxyl or alkoxy end groups. They can be produced in customary manner by copolymerization of formaldehyde or trioxane with suitable copolymerizable compounds, preferably cyclic ethers or cyclic acetals or by subsequent reaction of polyoxymethylenes with corresponding comonomers. The oxymethylene copolymer can be linear or branched.

Epoxides, for example, ethylene oxide, propylene oxide, are suitable above all as cyclic ethers.

Suitable above all as cyclic acetals are cyclic formals of aliphatic or cycloaliphatic α,ω-diols having 2 to 6, preferably 2, 3, or 4 carbon atoms, the carbon chain of which can be interupted at intervals of 2 carbon atoms by an oxygen atom, for example, glycol formal (1,3-dioxolane), propanediol formal (1,3-dioxane), butanediol formal (1,3-dioxepane), and diglycol formal (1,3,6-trioxocane).

The molding compositions of the invention in every case must contain at least one antioxidant. Its amount is suitably between 0.1 and 10 parts by weight to 1000 parts by weight of oxymethylene copolymer. Of the known antioxidants, the following phenolic compounds are especially well suited:

N,N'-bis-3-(3',5'-di-tert.-butyl-4'-hydroxyphenyl)-propionylhydrazine, 1,6-hexanediol-bis-3-(3',5'-di-tert.-butyl-4'-hydroxyphenyl)-propionate, 3,6-dioxaoctane-1,8-diol-bis-3-[3'-tert.-butyl-4'-hydroxy-5'-(methylphenyl)]-propionate, N,N'-hexamethylene-bis-3-(3',5'-di-tert.-butyl-4'-hydroxyphenyl)-propionamide, tetrakis-[methylene-3-(3',5'-di-tert.-butyl-4'-hydroxyphenyl)-propionyl]-methane and 1,3,5-trimethyl-2,4,6-tris(3',5'-di-tert.-butyl-4'-hydroxybenzyl)-benzene.

As further components the molding compositions of the invention can contain heat stabilizers, UV-absorbers, light protectants, lubricants, antistatic agents, nucleating agents, acid acceptors, fillers, coloring pigments, elastomers and other customary additives for polyoxymethylene molding compositions.

The superiority of the molding compositions based on the reduced emission of formaldehyde in thermoplastic shaping is clearly shown in the following examples and comparison experiments. The measurement of the formaldehyde liberated is carried out with the "Lion Formaldemeter" of Wilko GmbH, which instrument contains a fuel cell as detector. The apparatus has a measuring range of 0.1 to 99.9 ppm, in the range of 0.3 to 10 ppm the exactness is ±5%. In order to be able to operate in the lower measuring range, there is not measured the total amount of formaldehyde set free in the thermoplastic shaping. The formaldehyde concentrations stated in the examples and comparison experiments instead are relative values.

The compositions can comprise, consist essentially of, or consist of the stated materials.

Unless otherwise indicated, all parts and percentages are by weight.

DETAILED DESCRIPTION

Example 1

1000 parts by weight of a commercial, phenolic antioxidant containing molding composition made of an oxymethylene copolymer containing 99 mole percent oxymethylene and 1 mole percent of oxybutylene units and 1 part by weight of N,N'-bis-(diamino-1,3,5-triazin-2-yl)-ethylenediamine (A) were mixed in a powder mixer. The mixture was then processed on an injection molding machine of Type Stübbe 65S to molded pieces which consisted of 2 rectangular plates having the dimensions 62×78 mm and 2 respectively 3 mm thickness. The shot weight (plate and sprue) was 40 grams. The injection molding conditions were as follows:

| | |
|---|---|
| Nozzle diameter | 2 mm |
| Cylinder temperature | 195 °C. |
| Molding temperature | 90 °C. |

| | -continued | |
|---|---|---|
| Injection pressure | 760 | bar |
| Subsequent pressure | 760 | bar |
| Injection time | 7 | seconds |
| Time of cycle | 83 | seconds |

The ejected molded piece was first cooled for 120 seconds in the laboratory atmosphere and then in a cylindrical container having a diameter of 12 cm and a height of 24 cm. Immediately after placing the molded piece in the container it was closed and in order to have uniform distribution of the formaldehyde emitted shaken after 30 and 45 seconds, in each case for about 5 seconds. After 60 seconds the suction tube of the measuring apparatus was put through a previously closed opening of the container, which opening was exactly adjusted to the tube, and the formaldehyde content of the atmosphere in the container was measured. The measuring was repeated on two additional molded pieces after previously blowing out the container with compressed air and determination of a reference value. The formaldehyde concentration was 3 ppm.

Example 2

1000 parts by weight of a commercial molding composition made of an oxymethylene copolymer containing 99 mole percent oxymethylene and 1 mole percent oxybutylene units and containing a phenolic antioxidant was mixed with 1 part by weight of N,N'-bis-(diamino-1,3,5-triazin-2-yl)-1,12-diaminododecane(B) and then processed by injection molding. The mixing, injection molding and determination of formaldehyde emitted were carried out in the manner described in Example 1. There were measured 5 ppm of formaldehyde.

Comparison Experiment 1

The molding composition used in Examples 1 and 2 were processed by injection molding without additive. The injection molding and determination of the formaldehyde emitted were carried out in the manner described in Example 1. There were measured 15 ppm of formaldehyde.

The results of Examples 1 and 2 and Comparison Experiment 1 are set forth in following Table 1:

TABLE 1

| Example No. | Additive, parts by weight per 1000 parts by weight molding composition | Formaldehyde Emission (relative) ppm | Formaldehyde Emission based on Comparison Experiment 1 % |
|---|---|---|---|
| 1 | 1 (A) | 3 | 20 |
| 2 | 1 (B) | 5 | 33 |
| Comparison Experiment 1 | none | 15 | |

Example 3

1000 parts by weight of a commercial molding composition made of an oxymethylene copolymer containing 99 mole percent oxymethylene and 1 mole percent oxybutylene units and containing a phenolic antioxidant were mixed in a fluid mixer with 1 part by weight of N,N'-bis-(diamino-1,3,5-triazin-2-yl)-ethylenediamine (A). The mixture was then processed on an injection molding machine of the type Arburg Allrounder 200 S to test specimens according to DIN 53455 (German Industrial Standard 53455), No. 3 having a thickness of 4 mm. Two were injected per shot, the weight of which including the sprue was 30 grams. The injection conditions were as follows:

| Cylinder temperature | 190 | °C. |
|---|---|---|
| Molding temperature | 90 | °C. |
| Nozzle diameter | 2.5 | mm |
| Injection pressure | 840 | bar |
| Subsequent pressure | 840 | bar |
| Dynamic pressure | 140 | bar |
| Time of cycle | 76 | seconds |
| Injection time | 2.4 | seconds |

The ejected molded piece was first cooled for 90 seconds in the laboratory atmosphere and then in a cylindrical container having a diameter of 12 cm and a height of 24 cm. Immediately after placing the molded piece in the container, it was closed and in order to have uniform distribution of the formaldehyde emitted shaken after 45 and 75 seconds, in each case for about 5 seconds. After 90 seconds, the suction tube of the measuring apparatus was put through a previously closed opening of the container, which opening was exactly adjusted to the tube, and the formaldehyde content of the atmosphere in the container measured. The measuring was repeated on two additional molded pieces. Before each measurement after blowing out the container with compressed air, there was determined a reference value. The formaldehyde concentration was 5 ppm.

Example 4

1000 parts by weight of a commercial, phenolic antioxidant containing molding composition made of an oxymethylene copolymer containing 99 mole percent oxymethylene and 1 mole percent of oxybutylene units and 1 part by weight of N,N'-bis-(diamino-1,3,5-triazin-2-yl-1,6-diaminohexane (C) were mixed and then processed by injection molding. The mixing, injection molding, and determination of formaldehyde were carried out in the manner described in Example 3. The formaldehyde concentration was 6 ppm.

Example 5

1000 parts by weight of a commercial molding composition made of an oxymethylene copolymer containing 99 mole percent oxymethylene and 1 mole percent oxybutylene units and containing a phenolic antioxidant was mixed with 1 part by weight of 1,3-bis-(diamino-1,3,5-triazin-2-yl)-benzene (D) were mixed and then processed by injectin molding. The mixing, injection molding, and determination of formaldehyde were carried out in the manner described in Example 3. The formaldehyde concentration was 11 ppm.

Comparison Experiment 2

The molding compositions used in Examples 3, 4, and 5 were processed by injection molding without additive. The injection molding on determination of formaldehyde emitted was carried out in the manner described in Example 3. The formaldehyde concentration was 16 ppm.

The results from Examples 3 to 5 and Comparison Experiment 2 are set forth in following Table 2:

TABLE 2

| Example No. | Additive parts by weight per 1000 parts by weight molding composition | Formaldehyde Emission (relative) ppm | Formaldehyde Emission based on Comparison Experiment 2 % |
| --- | --- | --- | --- |
| 3 | 1 (A) | 5 | 31 |
| 4 | 1 (C) | 6 | 38 |
| 5 | 1 (D) | 11 | 69 |
| Comparison Experiment 2 | none | 16 | |

The formaldehyde binding additives can be mixed in already in an earlier processing step in the production of the molding composition. In following Examples 6 to 10, the formaldehyde binding material was added together with a phenolic antioxidant to a crude trioxane-copolymer and homogeneously distributed therein in the subsequent venting extrusion.

Production of the Copolymerizate

A mixture of 2500 parts by weight of trioxane, 69 parts by weight 1,3-dioxepane, and 2 parts by weight of dibutyl formal were polymerized in an open container at an initial temperature of 80° C. by addition of 15 ml of a t-butyl perchlorate solution in 1,2-dimethoxyethane (0.1 g/l). 5 minutes after addition of the initiator, the polymer block which was about 5 cm thick was coarsely comminuted and then while passing gaseous ammonia (about 50 ppm based on the polymerizate) over it ground to a particle size of 1 to 3 mm. The crude polymer still contained 5.3% of unreacted trioxane and 3.1% of thermally unstable components.

Example 6

1000 parts by weight of crude polymerizate, 3 parts by weight of hexanediol-bis-3-(3',5'-di-tert.-butyl-4'-hydroxyphenyl)-propionate and 2 parts by weight of N,N',-bis-(diamino-1,3,5-triazin-2-yl)-ethylenediamine (A) were mixed in a fluid mixer and then melted and degassed at 40 mbar in an extruder (ZDS-K 28 of the firm Werner & Pfleiderer) having three vacuum zones at following conditions: screw speed 150 rpm, 250° C. cylinder temperature. The product was drawn off as strands, solidified in a water bath, granulated and then dried for 3 hours at 120° C. The injection molding operation and the determination of formaldehyde emitted thereby were carried out by the method described in Example 3. There were measured 5 ppm of formaldehyde. To determine the thermal stability, a sample of granulate was heated for 2 hours in the air at 220° C., whereby there occurred a weight loss of 0.8%.

Example 7

1000 parts by weight of crude polymer, 3 parts by weight of hexanediol-bis-3-(3',5'-di-tert.-butyl-4'-hydroxyphenyl)-propionate and 2 parts by weight of 1,4,7-tris-(diamino-1,3,5-triazin-2-yl)-diethylenetriamine (E) were processed in the same manner as Example 6 to a granulated molding composition. The injection molding operation and the determination of formaldehyde emitted thereby were carried out by the method described in Example 3. There were measured 8 ppm of formaldehyde. To determine the thermal stability, a sample of granulate was heated for 2 hours in the air at 220° C., whereby there occurred a weight loss of 1.0%.

Example 8

1000 parts by weight of crude polymer, 3 parts by weight of hexanediol-bis-3-(3'-5'-di-tert.-butyl-4'-hydroxyphenyl)-propionate and 0.5 parts by weight of 1,4-bis-(diamino-1,3,5-triazinyl)-piperazine (F) were processed in the same manner as Example 6 to a granulated molding composition. The injection molding operation and the determination of formaldehyde emitted thereby were carried out by the method described in Example 3. There were measured 9 ppm of formaldehyde. To determine the thermal stability, a sample of granulate was heated for 2 hours in the air at 220° C., whereby there occurred a weight loss of 1.0%.

Example 9

1000 parts by weight of crude polymer, 3 parts by weight of hexanediol-bis-3-(3'-5'-di-tert.-butyl-4'-hydroxyphenyl)-propionate and 5 parts by weight of 1,4-bis-(diamino-1,3,5-triazin-2-yl)-piperazine (F) were processed in the same manner as Example 6 to a granulated molding composition. The injection molding operation and the determination of formaldehyde emitted thereby were carried out by the method described in Example 3. There were measured 9 ppm of formaldehyde. To determine the thermal stability, a sample of granulate was heated for 2 hours in the air at 220° C., whereby there occurred a weight loss of 1.1%.

Example 10

1000 parts by weight of crude polymer, 3 parts by weight of hexanediol-bis-3-(3'-5'-di-tert.-butyl-4'-hydroxyphenyl)-propionate and 2 parts by weight of 1,10-bis-(diamino-1,3,5-triazin-2-yl)-decane (G) were processed in the same manner as Example 6 to a granulated molding composition. The injection molding operation and the determination of formaldehyde emitted thereby were carried out by the method described in Example 3. There were measured 10 ppm of formaldehyde. To determine the thermal stability, a sample of granulate was heated for 2 hours in the air at 220° C., whereby there occurred a weight loss of 1.7%.

Comparison Experiment 3

1000 parts by weight of crude polymer and 3 parts by weight of hexanediol-bis-3-(3',5'-di-tert.-butyl-4'-hydroxyphenyl)-propionate were processed in rhe same manner as Example 6 to a granulated molding composition. The injection molding operation and the determination of formaldehyde emitted thereby were carried out by the method described in Example 3. There were measured 18 ppm of formaldehyde. To determine the thermal stability, a sample of granulate was heated for 2 hours in the air at 220° C., whereby there occurred a weight loss of 2.2%.

The results of Examples 6 to 10 and Comparison Experiment 3 are set forth in following Table 3:

TABLE 3

| Example No. | Additive parts by weight per 1000 parts by weight crude polymer* | Formaldehyde Emission (relative) ppm | Formaldehyde Emission based on Comparison Experiment 3 % | Weight loss after 2 hours/ 220° C. % |
| --- | --- | --- | --- | --- |
| 6 | 2 (A) | 5 | 28 | 0.8 |
| 7 | 2 (E) | 8 | 44 | 1.0 |
| 8 | 0.5 (F) | 9 | 50 | 1.0 |
| 9 | 5 (F) | 3 | 17 | 1.1 |

TABLE 3-continued

| Example No. | Additive parts by weight per 1000 parts by weight crude polymer* | Formaldehyde Emission (relative) ppm | Formaldehyde Emission based on Comparision Experiment 3 % | Weight loss after 2 hours/ 220° C. % |
|---|---|---|---|---|
| 10 | 2 (G) | 10 | 56 | 1.7 |
| Comparison Experiment 3 | none | 18 | | 2.2 |

*additional to 3 parts by weight antioxidant

The entire disclosure of German priority application No. P3518375.6 is hereby incorporated by reference.

What is claimed is:

1. An antioxidant containing oxymethylene copolymer molding composition having reduced formaldehyde emission upon thermoplastic processing, said composition also containing at least one formaldehyde binding material of the formula

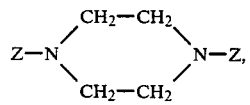     (I)

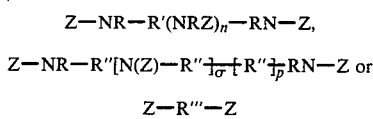     (II)

Z—NR—R"[N(Z)—R"]$_\sigma$[R"]$_p$RN—Z or     (III)

Z—R"'—Z     (IV)

in which

Z is a 4,6-diamino-1,3,5-triazin-2-yl group

R is hydrogen or a monovalent aliphatic hydrocarbon group having up to 18 carbon atoms or a monovalent unsubstituted or with one or more aliphatic hydrocarbon groups substituted cycloaliphatic or aromatic hydrocarbon group, R' is a 1 to 18 carbon atom di to pentavalent aliphatic hydrocarbon group, a di to pentavalent unsubstituted or with one or more aliphatic hydrocarbon groups substituted cycloaliphatic or aromatic hydrocarbon group, a divalent aliphatic-cycloaliphatic or aliphatic-aromatic hydrocarbon group containing up to 18 carbon atoms having the structure —A—B— or —A—B—A in which A is a divalent aliphatic and B is a divalent unsubstituted or with one or more aliphatic hydrocarbon groups substituted cycloaliphatic or aromatic hydrocarbon group, or a di to pentavalent group of the structure —C—X—C— having 1 to 18 carbon atoms, in which C is an at least divalent cycloaliphatic or aromatic hydrocarbon group and X is a divalent aliphatic hydrocarbon group, —O—, —S—, or —SO$_2$—, R" is a divalent aliphatic hydrocarbon group having up to 6 carbon atoms, R"' is a divalent aliphatic hydrocarbon group having up to 12 carbon atoms or a divalent cycloaliphatic or aromatic hydrocarbon group having up to 12 carbon atoms, n is 0, 1, 2 or 3, $\sigma$ is 1, 2 or 3 and p 0 or 1 in an amount sufficient to reduce the emission of formaldehyde upon thermoplastic molding.

2. An oxymethylene copolymer molding composition according to claim 1 wherein the formaldehyde binding material is present in an amount between 0.2 and 50 parts by weight based on 1000 parts by weight of the oxymethylene copolymer used.

3. A molding composition according to claim 1 wherein the formaldehyde binding material is present on the surface of the molding composition.

4. A molding composition according to claim 1 wherein the formaldehyde binding material is homogeneously mixed into the molding composition.

5. A molding composition according to claim 1 wherein the formaldehyde binding material is N,N'-bis-(diamino-1,3,5-triazin-2-yl-methylenediamine, N,N'-bis-(diamino-1,3,5-triazin-3-yl)-1,12-diaminododecane, N,N'-bis-(diamino-1,3,5-triazin-2-yl)-1,6-diaminohexane, 1,3-bis-(diamino-1,3,5-triazin-2-yl)-benzene, 1,4,7-tris-(diamino-1,3,5-triazin-2-yl)-diethylenetriamine, 1,4-bis-(diamino-1,3,5-triazin-2-yl)-piperazine, or 1,10-bis-(diamino-1,3,5-triazin-2-yl)-decane.

* * * * *